April 29, 1952
D. L. HALL
2,594,428
MEASURING SYSTEM
Filed Sept. 26, 1946
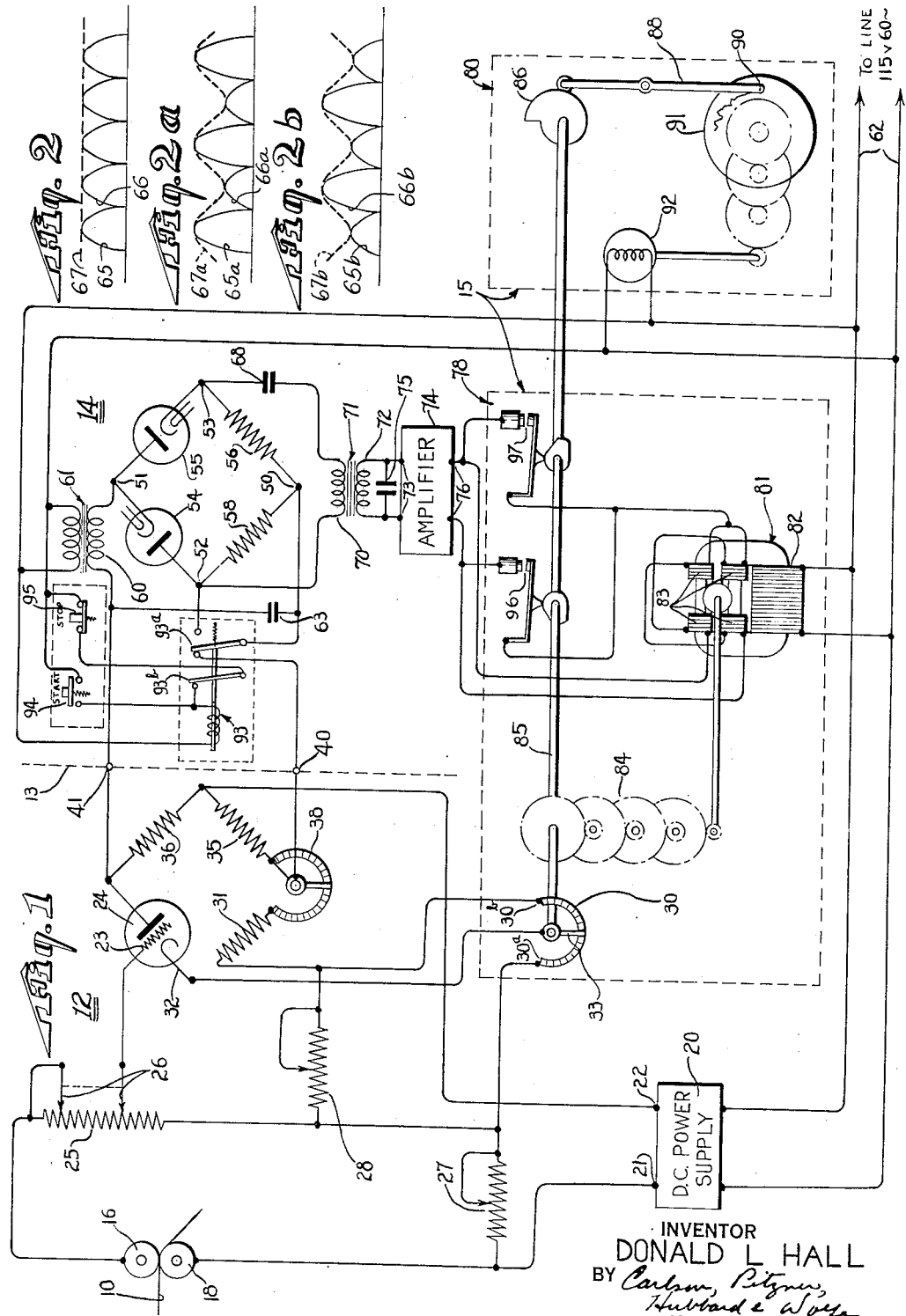
INVENTOR
DONALD L. HALL
BY
ATTORNEYS Patented Apr. 29, 1952

2,594,428

UNITED STATES PATENT OFFICE 2,594,428

MEASURING SYSTEM

Donald L. Hall, Rockford, Ill., assignor to Barber-Colman Company, Rockford, Ill., a corporation of Illinois Application September 26, 1946, Serial No. 699,540

8 Claims. (Cl. 346—31)

This invention pertains to apparatus for detecting and measuring small direct voltages. More particularly the invention relates to improved means for inverting a small direct voltage produced as a result of a moisture or other condition change and for utilizing the inverted voltage to effect an automatic and proportional exhibiting of the condition.

One object of the invention is to provide a novel device of the above character in which a small direct voltage resulting from a departure of a condition from a normal value is inverted into an alternating voltage of one phase or of opposite phase depending upon the polarity and of an amplitude which depends upon the magnitude of the direct voltage. The alternating voltage produced is not only more readily amplified than the corresponding direct voltage but is of a commercial frequency readily utilized in modern types of commercial servomotors and exhibiting devices.

Another object is to produce a simple and effective means for inverting direct voltages into corresponding alternating voltages of predeterminable amplitude and phasing and which does not require the use of mechanically moving parts or contacts. A correlative object is to provide a device of the character described which, although normally incorporating electron tubes, is also susceptible to the use of simple dry disk rectifier units where operating conditions make the use of tubes inadvisable.

A further object is to provide an improved detector for small direct voltages which is ideally suited for use with a resistor network and bridge circuit responsive to the moisture content of fabric and which may be coupled to the control windings of a reversible servomotor for purposes of exhibiting such moisture content.

Other objects and advantages of the invention will become apparent from the following detailed description taken in connection with the accompanying drawing in which:

Figure 1 is a schematic view and wiring diagram of detector and measuring apparatus embodying the novel features of the invention.

Fig. 2 is a plot of the voltage wave at the output of the rectifier portion of the device under "balanced" conditions corresponding to a zero D. C. input voltage.

Fig. 2a is a plot of the voltage wave at the output of the rectifier portion under conditions of an applied D. C. voltage of a given polarity and showing the alternating voltage component contained therein.

Fig. 2b shows the voltage wave under conditions of opposite input polarity resulting in a reversal of the phasing of the alternating voltage component.

The invention is applicable to the detection and exhibition of a wide variety of conditions. For convenience and simplicity of illustration, the invention has been shown in Fig. 1 and described in detail herein as embodied in an apparatus for exhibiting the moisture content of a traveling web 10 of cloth. Although this typifies the many uses to which the invention may be put, it is to be understood that I do not intend to limit the invention by such disclosure but aim to cover all modifications and alternative constructions and uses falling within the spirit and scope of the invention as expressed in the appended claims.

For purposes of ready understanding, the circuit disclosed in Fig. 1 and embodying the invention may be divided into three portions which, although cooperating with one another to produce a novel and improved result, may nevertheless be separately considered. The first of these portions, which is in electrical contact with the web 10, may be termed the input resistor network and is designated generally by the numeral 12. The second portion of the circuit, lying to the right of the dashed line 13, is the inverter 14 for inverting the small direct voltage derived from the network 12 into an alternating voltage of predetermined amplitude and phasing. The third portion of the device, located at the lower edge of Fig. 1 and indicated at 15, is the exhibiting portion of the system and in the present instance includes rebalancing and recording components.

Input resistor network

Referring more particularly to the input network 12 it will be seen that the fabric 10, whose moisture content is to be measured in terms of its resistance, passes between roller electrodes 16, 18. Means (not shown) are normally provided for continuously drawing the fabric through the rollers 16, 18, reference being made to the Lilja et al. Patent No. 2,358,338 which shows the fabric treating and transporting arrangement in greater detail.

To impress a voltage upon the cloth sample any well known type of regulated D. C. power supply 20 may be used, the voltage at supply terminals 21, 22 being applied to the electrodes in series with network resistances to be detailed. In the practice of the invention the current flowing through the fabric is caused to control the grid potential in a vacuum tube included in one leg of a Wheatstone bridge. Departure from a predetermined grid potential results in unbalancing the bridge and the production of a small voltage at the output terminals thereof which, in addition to enabling exhibition of moisture content, is also utilized to effect rebalancing of the network.

In the present embodiment the electrodes 16, 18 are coupled to the grid 23 of vacuum tube 24 through a calibration resistor 25. An additional network resistor 27 serves; with the resistor 25, to complete a shunt path around the fabric engaging electrodes. The resistor 25 carries sliders 26 thereon which may be manually adjusted to vary the total value of resistance 25 but still apply a predetermined portion of the voltage across resistor 25 to the grid of the tube. Voltage is applied to the resistor 27 and thus to resistor 25 and electrodes 16, 18 from the D. C. power supply 20 through a resistance network consisting of resistor 28 and parallel connected potentiometer 30, resistor 31, potentiometer 38 and resistor 35. The potentiometer 30 carries a slider 33 which is connected to cathode 32 of the tube 24, the position of the slider, and hence the bias on the cathode, being automatically adjusted by a follow-up arrangement to be described to rebalance the network to a "null" or zero output condition.

The network resistors 27, 28 in addition to serving as part of the network applying voltage to the fabric engaging electrodes, have an additional function which will again be referred to. In short, they are manually adjustable to determine the limits of fabric moisture content, in other words the range of fabric resistance, which may be detected and indicated by the remaining portions of the system.

The vacuum tube 24 constitutes one leg of a bridge circuit. The remaining legs as illustrated in Fig. 1 include resistors 31, 35 and 36, voltage being applied to resistors 35, 36 from terminal 22 of the D. C. power supply. At one corner of the bridge between resistors 31, 35 is a balancing potentiometer 38 which enables the bridge to be manually balanced prior to putting the system into operation. Normally the potentiometer 38 will require readjustment only as a result of changing the circuit constants or because of a change in the characteristics of the vacuum tube 24.

It will be apparent to one skilled in the art that by proper manual adjustment of resistors 25 and 38, and for a given setting of the rebalancing potentiometer 30, the bridge can be caused to be balanced under conditions in which the fabric has a predetermined moisture content. Under such conditions, zero voltage will appear across network output terminals 40, 41. Any increase or decrease in moisture content from the predetermined value will produce a D. C. voltage at the output terminals, the polarity of which is determined by the direction of the change in moisture content and the magnitude of which is dependent upon the amount of such variation.

D. C. to A. C. inverter

In accordance with the invention, novel and improved means are provided for inverting the direct voltage input signal which appears across the terminals 40, 41 to produce an alternating voltage whose phasing and amplitude are dependent upon the polarity and magnitude respectively of the direct voltage. The resulting alternating voltage may then be utilized to excite a reversible A. C. servomotor in a manner to be described. In the present instance a circuit for accomplishing such inversion includes a bridge circuit having input terminals 50, 51 and output terminals 52, 53. Adjacent legs of the bridge include diode rectifiers 54, 55 (which may be included within the same envelope if desired) and the opposite legs include resistors 56 and 58 respectively. The resistance of the latter may be readily determined by one skilled in the art, being preferably of the same order of magnitude as the normal operating resistance of the diodes.

The input terminals 50, 51 of the bridge are excited from two voltage sources. The first is an A. C. carrier wave derived from the secondary winding 60 of a transformer 61 which has its primary winding connected to the conventional 60-cycle supply line 62. In series with the secondary winding 60 are network terminals 40, 41 so that any direct voltage appearing across the latter is applied in series with the alternating voltage appearing across the transformer winding. Since the voltage ratio of the transformer 61 is preferably such that the peak voltage appearing on the secondary winding somewhat exceeds all normal values of the direct input voltage, the direct voltage may be considered to be "superimposed" upon the A. C. wave, shifting the latter upwardly or downwardly with respect to its axis.

Since the impedance of the resistor network 12 between terminals 40, 41 is relatively high, it has been found desirable to provide a shunt path for the alternating voltage induced in the winding 60. This is accomplished in the present embodiment by shunting the terminals 40, 41 by a capacitor 63. It will be noted that the capacitor is also connected to an electromagnetic switch or relay in order that it may be switched out of the circuit for a purpose which will later appear.

With the diodes 54, 55 polarized as shown in the drawing, the bridge acts as a full wave rectifier. This is readily seen by assuming that the input terminals 51 of the bridge has an instantaneous negative potential as compared to the input terminal 50. Under such conditions current flow will take place through diode 54 and resistor 58 causing a voltage drop through the latter resistor and making the output terminal 52 negative with respect to the output terminal 53. If it is next assumed that the input terminal 51 has a positive polarity, as it will in the succeeding half cycle of input voltage, current will flow through the diode 55 and the resistor 56, producing in this resistor a voltage drop which is in a direction to cause terminal 52 to be negative with respect to terminal 53. Thus it is seen that regardless of the polarity of the voltage applied to the input terminals, the voltage at the output of the bridge will be a direct voltage consisting of successive pulses, the amplitude of each pulse being dependent upon the amplitude of the A. C. pulse applied to the input terminals. It has been found that a similar rectifying effect is achieved using dry disk rectifier units in place of the diodes.

In the case where the control voltage across terminals 40, 41 is zero, the only signal then appearing across the input terminals 50, 51 of the bridge will be the alternating wave generated in the winding 60. Since successive half cycles of the latter are of equal amplitude, the rectified wave appearing across the output terminals 52, 53 will consist of identical pulses of direct voltage as indicated at 65, 66 in Fig. 2. The effect of any direct voltage across terminals 40, 41, however, is to produce an input signal which is non-symmetrical, in other words in which alternate half cycles are not of equal amplitude. Such a wave, when rectified, results in direct voltage pulses which are of unequal amplitude as indicated at 65a, 66a in Fig. 2a. The difference in amplitude between the pulses 65a, 66a is roughly proportional to the degree of nonsymmetry of the input wave, in other words to the magnitude of the direct control voltage which has been superimposed upon the A. C. wave. In the event that the direct voltage across terminals 40, 41 is of opposite polarity, the relative magnitudes of successive output pulses is reversed, being indicated at 65b, 66b in Fig. 2b.

Although the voltage wave at the output terminals 52, 53 of the bridge is unidirectional, it contains alternating voltage components, and in accordance with the invention only the latter are utilized for purposes of measurement. In the present embodiment such alternating voltage components are selectively passed by means of a capacitor 68 which is connected to terminal 53 and serves to block the passage of direct current in a manner which is well known to those skilled in the art. Included in the output circuit of the bridge and in series with the capacitor 68 is a primary winding 70 of a coupling transformer 71. The latter has a secondary winding 72 which feeds into input terminals 73 of an amplifier 74. Means are provided for filtering the complex voltage wave derived from the bridge circuit so that only the component at line frequency (ordinarily 60 cycles) is fed into the amplifier 74. In the present instance this is accomplished by shunting the secondary winding 72 of the coupling transformer 71 by a capacitor 75. The reactance of the latter is so chosen with respect to the reactance of the transformer so that resonance takes place at 60 cycles and including a range of frequencies somewhat less than 50 cycles. The circuit components in this portion of the circuit may be chosen by a process of trial and adjustment using an oscilloscope or by theoretical techniques well known in the art. After filtering, and as applied to the amplifier, the 60 cycle wave is of the general shape and phasing shown at 67, 67a and 67b in Figs. 2, 2a and 2b respectively.

It is highly desirable that any filter which may be associated with the input terminals of the amplifier be tuned to pass signals at line frequency but strongly discriminate against second and higher harmonics of the line frequency. Inspection of Fig. 2 shows that the full wave rectification occurring in the bridge circuit produces an output wave obviously having a large percentage of ripple at a frequency which is twice line frequency, in other words at 120 cycles per second. Since modern types of reversible servo-motors include a field winding which is connected to the supply line, the application of voltage at twice line frequency to the control windings merely produces heating without producing torque therein, a condition which is avoided by use of the filter circuit which has been described.

The amplifier 74, which has a pair of output terminals 76 feeding the exhibiting portion of the apparatus, is indicated merely in block form. It will be understood, however, that such amplifier may be any one of numerous commercial types suitable for amplifying an alternating voltage wave. If desired, the amplifier may be so constructed as to peak at the 60 cycle line frequency.

*Exhibiting portion*

The exhibiting portion of the device, shown in the lower half of the drawing and indicated generally by the numeral 15, in the present instance includes a balancing unit 78 and a recorder 80. Within the balancing unit is a reversible servo-motor 81 of a well known type which includes a field winding 82 and four shading windings 83. The latter are supplied from the output terminals 76 of the amplifier and perform a valve-like control function so that a small amount of alternating current therein causes the motor to rotate in either one direction or the other depending upon the phasing of such current with respect to the current in the field 82. The torque, and therefore the speed of rotation of the motor, on the other hand, is a function of the amplitude of the exciting wave. In short, the direction and speed of rotation of the servomotor depends upon the polarity and magnitude of the direct voltage across terminals 40 and 41 which in turn is dependent upon the variation of moisture content in the fabric from a pre-existing value.

Rotatively coupled to the servomotor 81 is a gear train 84 driving a shaft 85. The latter is coupled to the slider 33 of the rebalancing potentiometer 30 which is included in the network portion 12 to which reference has already been made. The rebalancing potentiometer serves as a follow-up device in a manner well known in servo systems. In the present embodiment the position of the slider 33 determines the potential applied to the cathode 32 of the vacuum tube 24 in the network. Thus any change in the grid potential of this tube, due to a change in the moisture content of the fabric, causes rotation of the servomotor 81 which continues until the slider 33 has moved sufficiently to restore the tube 24 to its initial state and thereby to rebalance the network.

It will be noted from inspection of Fig. 1 that the balancing shaft 85 also serves simultaneously to position the recording pen in the recorder 80. This is accomplished by means of cam 86 which determines the angular adjustment of a pen arm 88 which carries a pen 90 at its extremity. Rotation of a cooperating chart 91 upon the passage of time may be effected in a conventional manner by means of a synchronous driving motor 92 acting through any desired type of gear train.

Means are provided for enabling any desired range of moisture content to be accommodated on the chart, in other words, to cause the limit positions of the pen to correspond with predetermined percentages of moisture content. This is accomplished by adjustably controlling the potential existing at the end points of the rebalancing potentiometer 30. In the circuit illustrated the potential existing at the left-hand terminal 30a of the potentiometer 30 may be adjusted by moving the slider of the network resistor 27 while the potential at the opposite end 30b may be varied by adjustment of the network resistor 28.

In order to prevent the servomotor 81 from driving the recorder arm 88 off of the associated scale and in order to prevent possible damage to the moving parts under extreme moisture conditions, limit switches 96 and 97 are provided which are controlled by cams rotatably driven by the balancing shaft 85. If the shaft 85 should, for any reason, be driven into a limit position, the appropriate one of the limit switches 96, 97 would close. The latter causes short-circuiting of a diagonally opposed pair of the windings 83 and a momentary reversal of the motor resulting in oscillation or hunting about the limit position. It will be appreciated, however, that other types of limiting arrangements could be used without departing from my invention.

It is frequently necessary to shut down the fabric treating apparatus, for example, at the end of a shift or run of a particular kind of goods. Since the latter interrupts the continuity of the measuring process, the percentage of moisture indicated during the short period of time after the treating apparatus is restarted not only is entirely meaningless for control purposes but may be actually misleading. In accordance with one aspect of my invention, therefore, means are provided for causing the pen of the recorder to travel to one of its extreme positions when the fabric treating device is shut down, the latter serving as definite notice to one reading the chart that a shutdown has occurred. This is accomplished in the present embodiment by providing an electrical contactor 93 having contacts 93a and 93b. The coil of the contactor is initially energized by a "start" switch 94 as an incident to starting up the fabric treating process after which the winding continues to be energized by the closure of the "sealing in" contacts 93b. A "stop" switch 95, which is operated as an incident to shutting down the fabric treating apparatus, deenergizes the contactor. Contacts 93a form a single pole double throw switch serving to short circuit the bridge resistor 58 during "off" periods. Such shorting then maintains the bridge in an unbalanced condition and causes the pen 90 to oscillate slightly about one of its limit positions until the apparatus is put into motion and the "start" switch 94 is operated to restore the circuit to its normal condition as shown in the drawing.

Résumé of operation

Although the operation of the measuring system will be apparent from the foregoing description, the following brief summary will be helpful. It will be assumed at the outset that the network bridge including the vacuum tube 24 has been initially balanced by proper adjustment of the potentiometer 38 and that the calibration resistor 25 has been adjusted so that for a predetermined moisture content the pen 90 occupies the corresponding point on the chart 91. It will be further assumed that the network resistors 27, 28 have been adjusted to predetermine the range of moisture content which will be indicated on the chart. Under such circumstances, and after the follow-up has reached an equilibrium position, a zero output voltage will appear across the terminals 40, 41 and the signal applied to the input terminals 50, 51 of the inverter bridge will be a symmetrical A. C. wave. Since the rectified wave appearing at the output terminals 52, 53 will then consist of successive pulses which are substantially identical, there will be no component in the output wave having a frequency which is the same as that of the supply line. Accordingly the output of the amplifier will be substantially zero and the motor 81 will remain motionless.

Should the amount of moisture in the fabric change, this fact will be reflected in a change of resistance between the electrodes 16, 18 and a change in the voltage on the grid of the vacuum tube 24. The latter will change the effective cathode-plate resistance of the tube causing an unbalance in the condition of the bridge and the presence of direct voltage across terminals 40, 41 at the output of the bridge. The latter causes the A. C. wave supplied to the inverter bridge to be nonsymmetrical about its axis, and the successive rectified pulses produced at the output terminals 52, 53 will be of unlike amplitude. The rectified wave will, therefore, contain an A. C. component at supply line frequency as indicated at 67a in Fig. 2a. The latter is selectively passed by the filter 72, 75, amplified and applied to the control windings 83 of the servomotor.

Depending upon whether the voltage wave is of a phase as shown at 67a in Fig. 2a or at 67b in Fig. 2b, the servomotor 81 will rotate in one direction or the other. The resulting rotation of the balancing shaft 85 will cause movement of the slider 33 in the balancing potentiometer 30, the latter, by changing the potential at the cathode of the vacuum tube 24, serving to change the effective resistance of the tube to effect a rebalancing of the network. Simultaneously, rotation of the shaft 85 will cause movement of the cam 86 and a repositioning of the pen 90 on the recorder chart.

For the sake of simplicity and ready understanding the invention has been discussed as applied to a continuous moisture recorder. It will be apparent, however, that the invention is equally applicable to the measurement of other conditions and for use with other types of exhibiting devices. It will likewise be apparent that the rotational movement of the balancing shaft 85 may be utilized to vary the speed of the fabric 10 between drying rolls in the fabric treating apparatus to automatically maintain the moisture content at a predetermined value. The sensitivity of the system and its rapid and proportional response to moisture changes make it ideally suited to the latter purpose and to analogous purposes which will appear to one skilled in the art.

I claim as my invention:

1. A device for detecting a small direct voltage comprising a full wave rectifier having an input circuit and output circuit and of a type capable of converting an alternating input current to a direct output current consisting of a succession of rectified pulses, and a source of alternating voltage in said input circuit in series with said direct voltage.

2. A device for detecting a small direct voltage comprising a full wave rectifier having an input circuit and an output circuit, a source of alternating voltage in said input circuit in series with a source of the input voltage to be detected and relatively greater in amplitude, and a filter in said output circuit for discriminating against alternating voltages which are in second harmonic relation to the alternating voltage in said input circuit.

3. A device for detecting a small direct voltage comprising a full wave rectifier having an input circuit and an output circuit, a source of alternating voltage in said input circuit in series with a source of the direct voltage to be detected and relatively greater in amplitude, and a filter in said output circuit for selectively passing a voltage signal of a frequency which is substantially the same as said alternating voltage source.

4. In a servo system the combination comprising a source of direct voltage which is of a magnitude and polarity corresponding to changes in a condition to be controlled, a source of alternating voltage of a fundamental frequency and greater in amplitude than normal values of said varying direct voltage, a full wave rectifier having an input circuit and an output circuit and adapted to convert an alternating input current into a succession of unidirectional current pulses in said output circuit, a capacitor in series with said output circuit and means including an electrical series connection for superimposing said voltages and applying the resultant voltage to said input circuit.

5. In a device for detecting direct voltages, the combination of a bridge circuit having input and output terminals, a source of variable direct voltage, a source of alternating voltage relatively greater in amplitude than normally attained direct voltages and at a fundamental frequency, means applying said voltages to said input terminals in series relation, and rectifiers in at least two adjacent legs of said bridge, said rectifiers being polarized to produce a voltage at said output terminals consisting of unidirectional pulses and having an alternating voltage component at said fundamental frequency when said direct voltage is at a value other than zero.

6. In a device for detecting direct voltages, the combination comprising a source of variable direct voltage including a high impedance resistor network, a full wave rectifier having an input circuit and an output circuit, a source of alternating voltage of a fundamental frequency and of an amplitude greater than the amplitude of normally attained direct voltages, means including an electrical series connection for applying said voltage sources to the input of said rectifier in superimposed relation, and a capacitor across said direct voltage source for by-passing the alternating current flowing in the input circuit of said rectifier and serving as a return path therefor.

7. In a motor control circuit, the combination comprising a network for producing a direct control voltage in accordance with changes in a condition and having a high impedance, a bridge circuit having input and output terminals, said bridge circuit having rectifiers in at least two adjacent legs thereof and resistors in the remaining legs, an alternating voltage source in series with said direct voltage across said input terminals and of relatively greater magnitude than normally attained values of said direct voltage, said rectifiers in said bridge being polarized to produce a succession of unidirectional pulses at the output terminals of said bridge, and a capacitor normally shunted across said high impedance circuit for by-passing the alternating current and serving as a return path therefor.

8. In a device for recording a condition to be controlled and for use with adjustable means for maintaining said condition, a normally balanced electrical circuit including means producing a voltage in accordance with the condition, said circuit also including follow-up rebalancing means for neutralizing the effect of a voltage change in said circuit brought about by a change in the condition, a timed recorder actuated by said circuit for recording said condition, the movable element in said recorder being mechanically coupled to said follow-up means, and means operated as an incident to the shutting down of said condition maintaining means for greatly unbalancing said electrical circuit thereby to drive the recorder to an extreme position and to positively indicate the interval during which shutdown exists.

DONALD L. HALL.

REFERENCES CITED

The following references are of record in the file of this patent:

UNITED STATES PATENTS

| Number | Name | Date |
| --- | --- | --- |
| 2,148,718 | Agins | Feb. 28, 1939 |
| 2,180,487 | Triplett | Nov. 21, 1939 |
| 2,203,689 | MacDonald | June 11, 1940 |
| 2,341,280 | Ludbrook | Feb. 8, 1944 |
| 2,342,629 | Evjen et al. | Feb. 29, 1944 |
| 2,377,474 | Allwein | June 5, 1945 |
| 2,392,916 | Gruss | Jan. 15, 1946 |
| 2,414,102 | Hull et al. | Jan. 14, 1947 |
| 2,414,317 | Middel | Jan. 14, 1947 |
| 2,424,568 | Isbister et al. | July 29, 1947 |
| 2,446,188 | Miller | Aug. 3, 1948 |
| 2,447,232 | Cartotto | Aug. 17, 1948 |
| 2,447,321 | Ertzmann | Aug. 17, 1948 |
| 2,469,005 | Russell | May 3, 1949 |